United States Patent
Ramirez Loaiza et al.

(10) Patent No.: US 11,568,014 B2
(45) Date of Patent: Jan. 31, 2023

(54) INFORMATION CENTRIC NETWORK DISTRIBUTED SEARCH WITH APPROXIMATE CACHE

(71) Applicant: Intel Corporation, Santa Clara, CA (US)

(72) Inventors: Maria Ramirez Loaiza, Beaverton, OR (US); S. M. Iftekharul Alam, Hillsboro, OR (US); Gabriel Arrobo Vidal, Hillsboro, OR (US); Ned M. Smith, Beaverton, OR (US); Satish Chandra Jha, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 446 days.

(21) Appl. No.: 16/457,686

(22) Filed: Jun. 28, 2019

(65) Prior Publication Data
US 2019/0325001 A1   Oct. 24, 2019

(51) Int. Cl.
*G06F 16/9538* (2019.01)
*G06F 16/242* (2019.01)
*H04L 67/1097* (2022.01)
*H04L 67/568* (2022.01)

(52) U.S. Cl.
CPC ...... *G06F 16/9538* (2019.01); *G06F 16/2425* (2019.01); *H04L 67/1097* (2013.01); *H04L 67/568* (2022.05)

(58) Field of Classification Search
None
See application file for complete search history.

(56) References Cited

U.S. PATENT DOCUMENTS

| | | | | |
|---|---|---|---|---|
| 8,996,509 | B1 * | 3/2015 | Sundaram | G06F 16/9535 707/723 |
| 2013/0243001 | A1 * | 9/2013 | Byun | H04L 47/365 370/392 |
| 2014/0114942 | A1 * | 4/2014 | Belakovskiy | G06F 16/328 707/706 |
| 2016/0105524 | A1 * | 4/2016 | Farhadi | H04L 67/02 370/412 |
| 2016/0224672 | A1 * | 8/2016 | Bindal | G06F 16/24575 |
| 2017/0078185 | A1 * | 3/2017 | Yao | H04L 45/20 |
| 2018/0197223 | A1 * | 7/2018 | Grossman | G06Q 30/0621 |

OTHER PUBLICATIONS

Chan, Kevin, "Fuzzy Interest Forwarding", In Proceedings of the Asian Internet Engineering Conference (AINTEC 17). ACM, New York, NY, USA, (2017), 31-37.
Manning, C D, "An Introduction to Information Retrieval.", Cambridge, England: Cambridge University Press., (Apr. 1, 2009), 581 pgs.

* cited by examiner

*Primary Examiner* — Thu N Nguyen
(74) *Attorney, Agent, or Firm* — Schwegman Lundberg & Woessner, P.A.

(57) ABSTRACT

Systems and techniques for an information centric network (ICN) distributed search with approximate cache and forwarding information lookup. For example, a search interest packet may be received. Here, the search interest packet includes search criteria and a signal indicating that it is a search interest packet. A search for content—including content in a local content store—that meets the search criteria may then be performed. Once complete, a data packet that includes the results of the search may be transmitted towards an author of the search interest packet.

24 Claims, 8 Drawing Sheets

INFORMATION CENTRIC NETWORK DISTRIBUTED SEARCH WITH APPROXIMATE CACHE

TECHNICAL FIELD

Embodiments described herein generally relate to computer networking and more specifically to an information centric network (ICN) distributed search with approximate cache and forwarding information lookup.

BACKGROUND

ICN is an umbrella term for a new networking paradigm in which information itself is named and requested from the network instead of hosts (e.g., machines that provide information). To get content, a device requests named content from the network itself. The content request may be called an interest and transmitted via an interest packet. As the interest packet traverses network devices (e.g., routers), a record of the interest is kept. When a device that has content matching the name in the interest is encountered, that device may send a data packet in response to the interest packet. Typically, the data packet is tracked back through the network to the source by following the traces of the interest left in the network devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
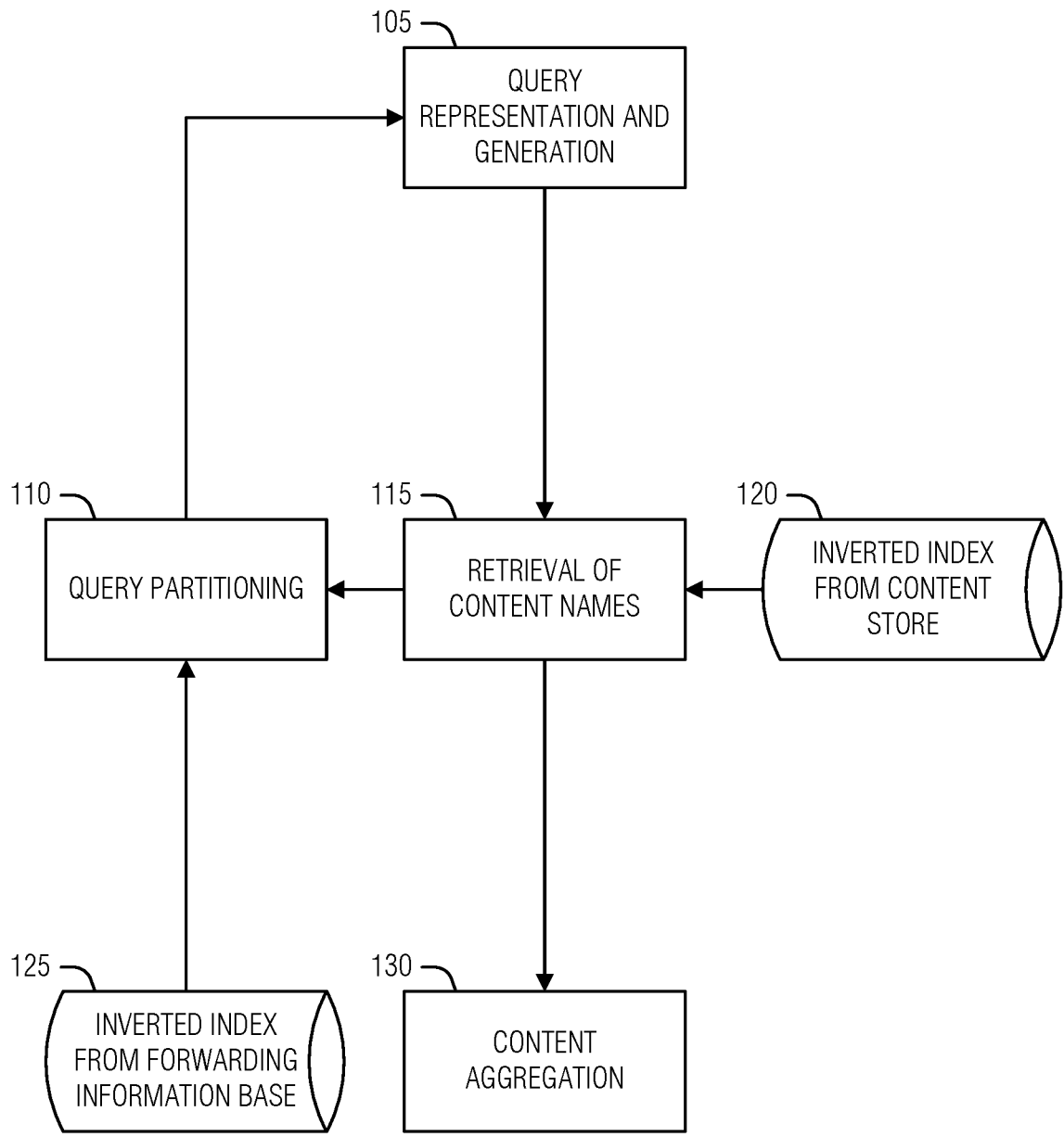
FIG. 1 illustrates an example of a distributed search engine, according to an embodiment.

Devices equipped with computing, communication, and storage resources (e.g., smart or intelligent devices) are proliferating, finding themselves in a greater number of environments than ever before. For example, self-driving cars carry data center-like compute resources and communicate with both infrastructure components and neighboring cars to ensure efficient and safe navigation on the road. Passengers of self-driving cars also may share information—e.g., contents such as audio streams, deals, documents, etc.—with others while on the road.

With capabilities now resident in smart devices, self-organization into ad hoc networks is becoming a more likely and useful option than it has been previously. Here, devices simultaneously may be producers, processors, or consumers of different information. In such networks, ICN is a natural fit for propagating information in such a dynamic environment. The produced or created data, however, may be represented with different naming conventions, syntactical structure, or synonymous words. Because ICN relies on names for its operation, it is important that the network understand the semantics of names representing data to effectively handle the information.

Traditional ICN frameworks such as named data networking (NDN) or content centric networking (CCN) use exact matching of an interest name with the name of data stored into content store and lack semantic understanding of names. While incorporating semantic understanding into the ICN stack may provide users with a group of similar information faster, it is less efficient in terms of compute and storage needed to enable semantic matching. Hence, an efficient semantic matching technique that is integrated within the ICN framework would be beneficial for searching and retrieving content.

Fuzzy Interest Forwarding (FIF) is a technique that adds a semantic understanding function to NDN for cache and forward information base (FIB) lookup. FIF constructs a vector space model of NDN names and then applies a standard vector distance function to measure similarity among names. Thus, if a data name is within a threshold distance from an interest name, the data may be matched and returned in response to the interest. An issue with FIF involves the semantic similarity function requiring a globally synchronized model for all nodes. Further, FIF also tends to place a high demand on storage and computation resources.

To address the issues noted above, an efficient mechanism to find semantically similar contents from an ICN content store and data producers is described herein. A naming scheme may be used in which the name of an interest packet contains one or more of: a prefix that indicates a request for an approximate search; a search string (e.g., in natural language); a similarity score threshold (t); or a maximum number of data entries (N) to retrieve in response to an interest. The ICN may also be augmented with two inverted indices that are calculated for the content store and FIB. The inverted indices may be updated periodically or when the content store or FIB entries are updated.

In operation, when the ICN layer of a node receives an interest packet, the node extracts the search string from the name (e.g., in response to parsing the prefix requesting an approximate match) and uses an inverted index for the content store to determine whether there are entries with similarity scores that meet (e.g., is greater than or less than depending on the metric) the given threshold t. If there are N entries found in the content store, they will be returned immediately. If there are only K—where K<N—entries found in the content store, the inverted index for the FIB is consulted to determine potential next hops that may provide semantically relevant information for the remaining (R) entries, where R=N−K. In this way, the interest may be partially filled at an ICN node and the remaining data sought at other ICN nodes. A forwarding strategy to choose a number of next hops out of all the hops determined from FIB inverted index and a content aggregation strategy to bundle multiple data or manifests (e.g., links, references, names, etc. to actual data) are described below.

These techniques pro-actively maintain inverted index tables for the content store and the FIB in each ICN node. This enables faster information location and retrieval. Additional details and examples are given below.

FIG. 1 illustrates an example of a distributed search engine, according to an embodiment. The search engine will generally be part of an ICN node (e.g., router). As illustrated, the search engine includes a query representation and generation component 105, a query partitioning component 110, a content name retrieval component 115, and a content aggregation component 130. Each of these components is implemented in circuitry, such as a processor, as described below with respect to FIG. 7.

The query representation and generation component 105 is arranged to manipulate and process a query for content names based on a convention. In an example, a search query may be signaled (e.g., represented) via a special interest packet. In an example, the search interest packet includes a name field and a parameters field. In an example, the search interest packet includes a stop-lists field.

In an example, the name field takes the form of "/search/query=<QUERY_STRING>/entries=N," where "/search" that is a pre-defined prefix to initiate a distributed search request, although any prefix defined to signal a search may be used. The <QUERY_STRING> component is the search string. The "entries=N" element of the name indicates a maximum number of matched entries requested in the interest packet.

The parameters field may include a "similarityScoreThreshold" element that is used to indicate how precise the name matching needs to be to pair data with the interest packet. Thus, if a comparison technique results in small numbers indicate closeness between two names, then the similarityScoreThreshold defines the value under which such a comparison results in "matched" names. In an example, the parameters may include the additional parameters (e.g., flags) "index_only" or "meta_included" to respectively indicate whether the interest packet author is requesting links or manifests of matched data (e.g., only names, not the content) or whether meta information should be within the search scope or not.

The stop-lists field may be used when a query is modified to forward onto another network node to find entries that are not found locally. The stop-lists field may include a set of digests calculated from already matched content names. This helps to avoid retrieval of duplicate content or name. In an example, the stop lists may include other content identifiers—such as universally unique identifiers (UUIDs), Object IDs (OIDs), World Wide Web Consortium (W3C) Decentralized IDs (DIDs), etc.—or the stop lists may contain a manifest of content references—such as an Hypertext Markup Language (HTML) reference (HREF), NDN links etc.—to content that is already known to the query issuer (e.g., the node processing the search interest packet or the search interest packet author).

In an example, intermediate query results not found in a stop list may be added to the stop list before proceeding to a next node. Duplicate contents may be thus detected and omitted from the query results provided by subsequent nodes. In an example, the stop list may be returned to the originator where the delta stop list shows the newly found references.

In an example, similarity scores of already matched entries are also included in the stop lists. This helps to find or retrieve higher quality results in scenarios where one or more subsequent nodes (e.g., next hops) have contents with a better similarity score than the present node.

The content name retrieval component 115 is arranged to produce the most relevant content names in response to a search query. The content name retrieval component 115 is configured to parse the query and find local cache entries for the given search string—and, for example, using a similarity score in the query to determine a content match. In an example, the content name retrieval component 115 is configured to use content store inverted index 120 to collect the list of potential matches.

The content name retrieval component 115 is also configured to compute a similarity metric between the query and content name strings. The similarity score is used to rank matched entries and pick the top N entries that have a similarity score better (greater than or less than according to the metric) than the threshold specified in the search interest packet. In an example, the content name retrieval component 115 may be implemented as a simple matching mechanism to provide a quick response. However, in an example, the content name retrieval component 115 may be configured to use more complicated query techniques, such as term expansion, to improve results.

Figure 2:
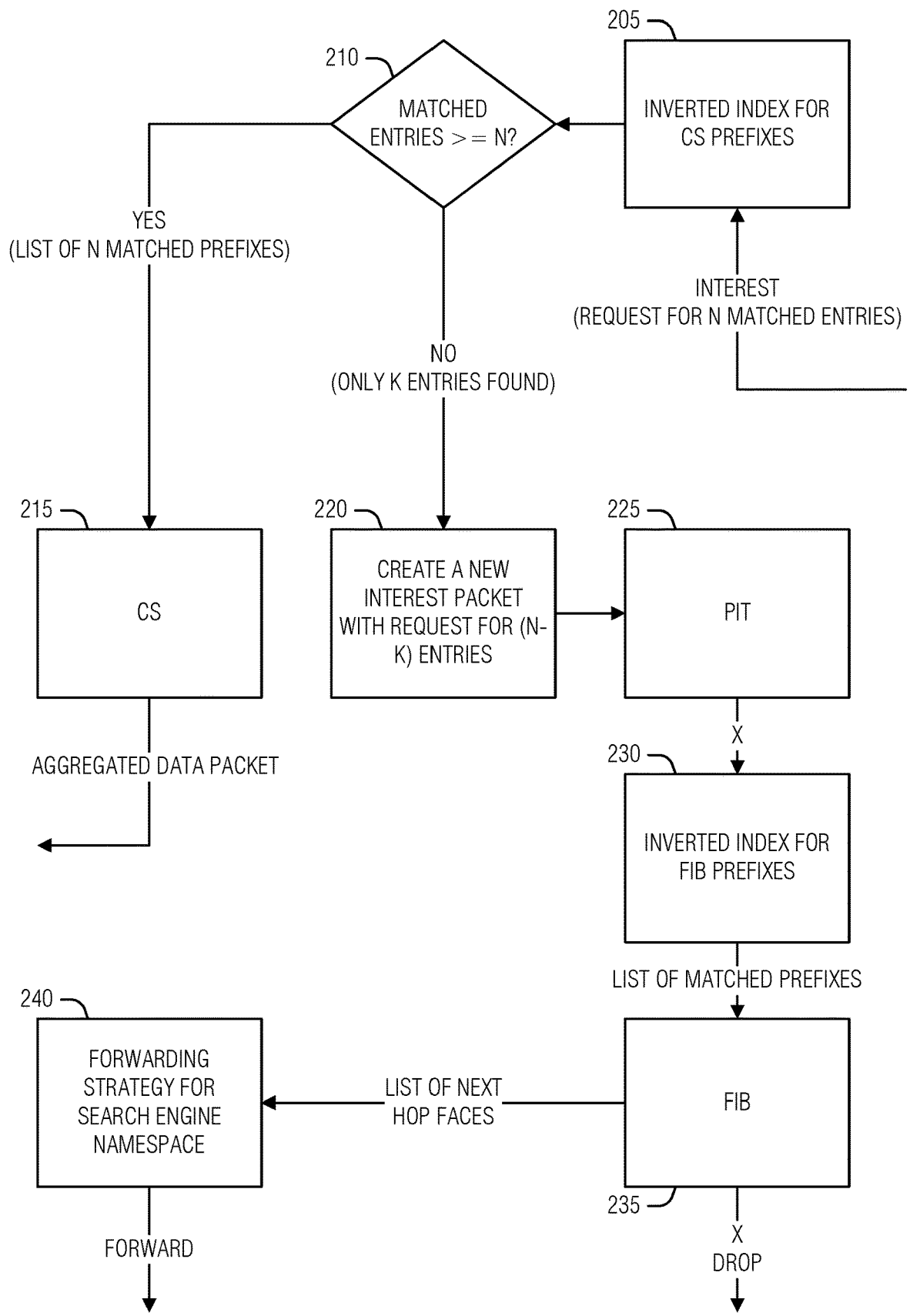
FIG. 2 is an example of an interest packet forwarding technique, according to an embodiment.

The query partitioning component 110 is arranged to create a subquery if the number of expected results specified in the search interest packet are not found in the node's content store. The query partitioning component 110 is configured to use a FIB inverted index 125—constructed from FIB prefixes—to find out potential routes (e.g., next hops) that may provide additional content names to meet the number of results requested in the search interest packet. Thus, if the original search interest packet requests N matched entries, and there are only K entries locally—again where K<N—, the FIB inverted index 125 is consulted to determine potential next hops that may provide semantically relevant information for the remaining entries R, where R=N−K. To accomplish this, the query partitioning component 110 is configured to create a new search query with a digest of already found content names—to avoid retrieval of duplicate information—and a request for $$\frac{R}{X}$$

entries. Because partial matching with FIB prefixes may result into multiple next hop entries (referred to here as Y), X is a pre-configured parameter—where $1 \le X \le Y$—that indicates how many entries of R should be satisfied by any given next hop. X is a limiting element because, if X>1, then more than R entries may be received when the search is forwarded to more than one other node. This may result in discarding returned results, wasting network resources. Here, X may be tuned to manage the trade-off between search response time and network overhead (e.g., due to transmission of additional matched entries). FIG. 2, discussed below, illustrates an example of the working principle of the query partitioning component 110 with an interest packet forwarding mechanism for a search string query, where X=1.

In an example, in a clustered network, the cluster head may act to partition the query. In such a network, search interest packets may be forwarded towards cluster heads or locally known pre-designated nodes. When these nodes have better awareness of contents in a neighborhood of nodes, partitioning the query may be done more efficiently. For example, rather than a node selecting locally available K entries based only on similarity score threshold, a cluster head or designated node may help in getting better entries with higher similarity scores within the neighborhood.

The content aggregation component 130 is arranged to receive multiple content responses or manifests (e.g., containing a set of names) and aggregate them together before sending them back towards the consumer (e.g., following the PIT entry for the search interest packet). The content aggregation component 130 may be configured to remove the PIT entry only after N data packets are sent back to the search interest packet author.

Figure 3:
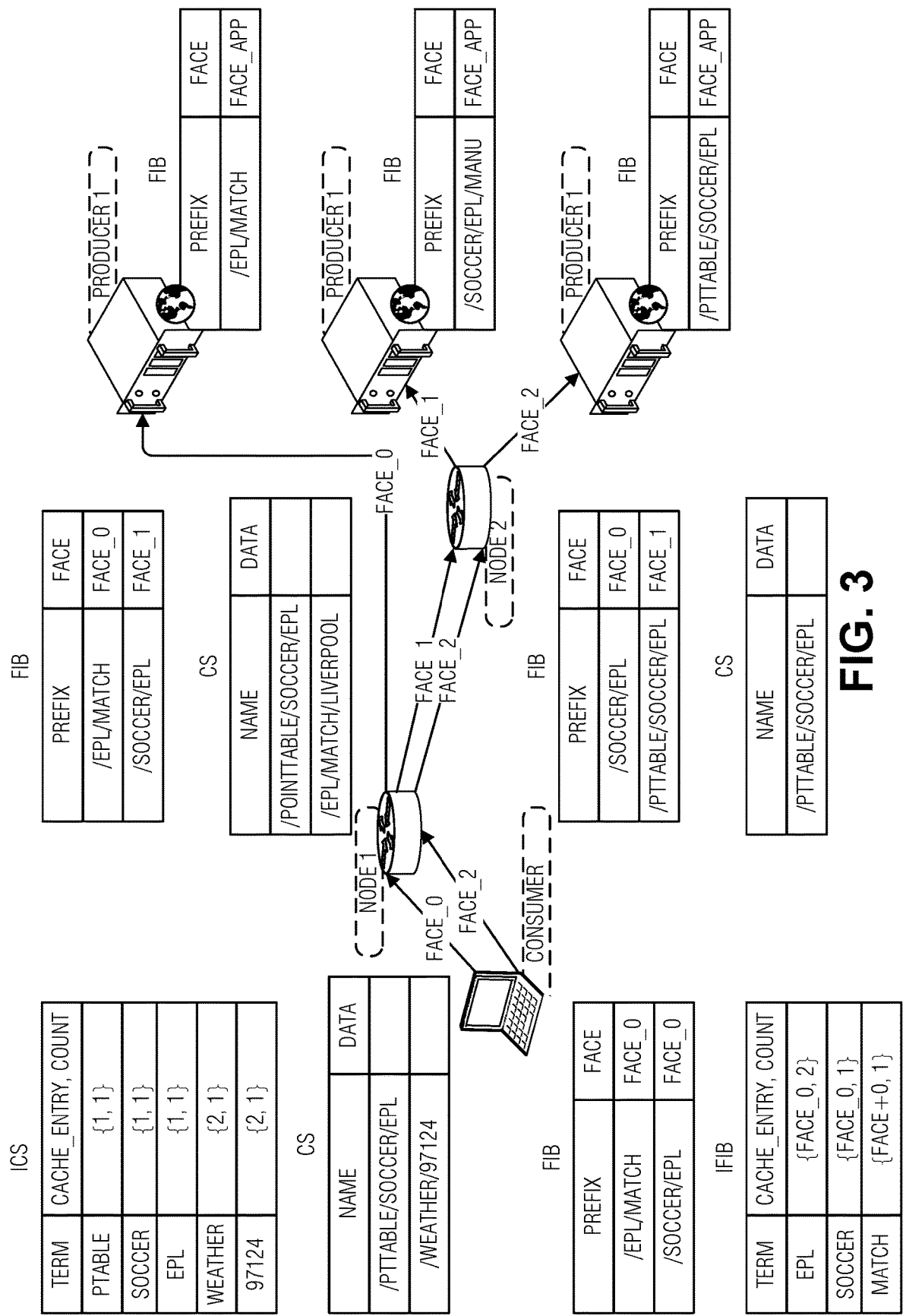
FIG. 3 illustrates an example of a network topology for distributed searching, according to an embodiment.

In an example, if there are only K found in the node's content store, the content aggregation component 130 does not immediately return those entries to the consumer, but rather is configured to invoke the query partitioning component 110 to perform additional queries until N entries are found or, in an example, a pre-configured timer expires. The content aggregation component 130 is configured to create an addition virtual face, $Face_{Search}$, to store intermediate search results and aggregate them with incoming results. $Face_{Search}$ interfaces with the process performing the aggregation. FIG. 3 illustrates an example topology of this partitioned query and data aggregation. FIG. 4 illustrates an example of a message flow for this process.

The inverted indexes 120 and 125 include a vocabulary (e.g., list of terms) and posting lists for each of the terms. A posting list may be a list of documents and locations within a document where the corresponding term occurs. When content is received, node parses a description of the content from the name of the content (e.g., any parsing function that extracts a description of the content from its name). The parsed content description then may be added to the index. In an example, the content name is partitioned into terms. The terms may be searched for in the vocabulary list of the index and, if found, an item with the location (e.g., position of the term within whole content) and content id (e.g., a locally generated unique identifier to denote the content) are added into the corresponding posting list. If the terms are not available, then a decision is made as to whether they should be added to the vocabulary or not.

In an example, while building the vocabulary list, semantic tags of content may be maintained if semantic entailment of contents is available. W3C Web Ontology Language (OWL) or Resource Description Framework (RDF) are two examples of semantic tagging standards that may be used. Semantic tagged values may be matched against a query that specifies an OWL or RDF tag rather than a vocabulary list, which may be in different in different languages, for example.

FIG. 2 is an example of an interest packet forwarding technique, according to an embodiment. As illustrated, a search interest packet is received at an ICN node and matched to similar content in a local content store via an inverted index (operation 205). As illustrated, the search index packet indicates that it is requesting N results to the search.

The node then determines whether it found N results that were within a similarity score threshold specified in the search interest packet (decision 210). If yes, the node retrieves and aggregates the content from the content store (operation 215) and sends it back to the search interest packet author.

If the content store does not have enough matches (decision 210), the node creates a new interest packet with a search for the remaining search results (e.g., referred to as R above with respect to FIG. 1) (operation 220). A PIT entry is created to link this new interest to the original search interest (operation 225). Also, the inverted index for the FIB may be updated (e.g., entries are added, removed, changed, etc.) and consulted (operation 230) to determine a list of semantically matched FIB prefixes. The FIB is then consulted (operation 235) to determine the next hops for these prefixes. The new interest packet is dropped if no entries are found in the FIB corresponding to these prefixes (operation 235). Next hop information is then passed to the forwarding strategy engine and the new interest packet is routed to other nodes that may be able provide content to complete the search request (operation 240).

FIG. 3 illustrates an example of a network topology for distributed searching, according to an embodiment. Within the context of the previous discussions related to FIGS. 1 and 2, the operations described above may be performed by the first node, NODE 1, and the consumer is the author of the search interest packet. Note that the nodes may have corresponding inverted indices to a FIB or to a content store, respectively identified as ICS or IFIB in FIG. 3.

In this topology, the consumer uses its IFIB to contact NODE 1 with the search interest packet. NODE 1 may then satisfy some elements from its own content store (determined via the ICS), and propagate a new search interest to NODE 2 to complete the search request, and so on as described above.

Figure 4A:
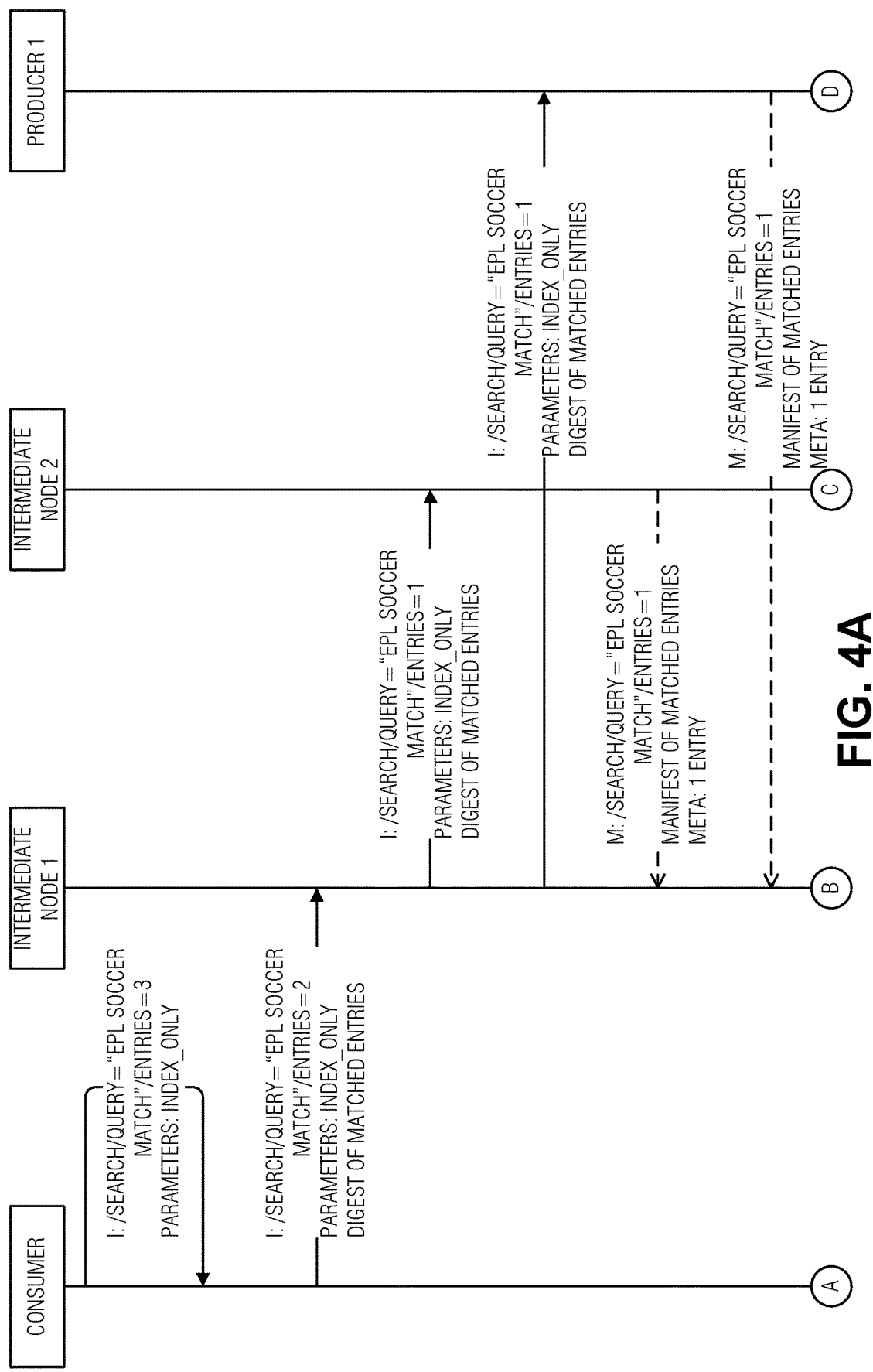
FIGS. 4A-4B illustrate an example of a message flow during execution of a distributed search, according to an embodiment.
Figure 4B:
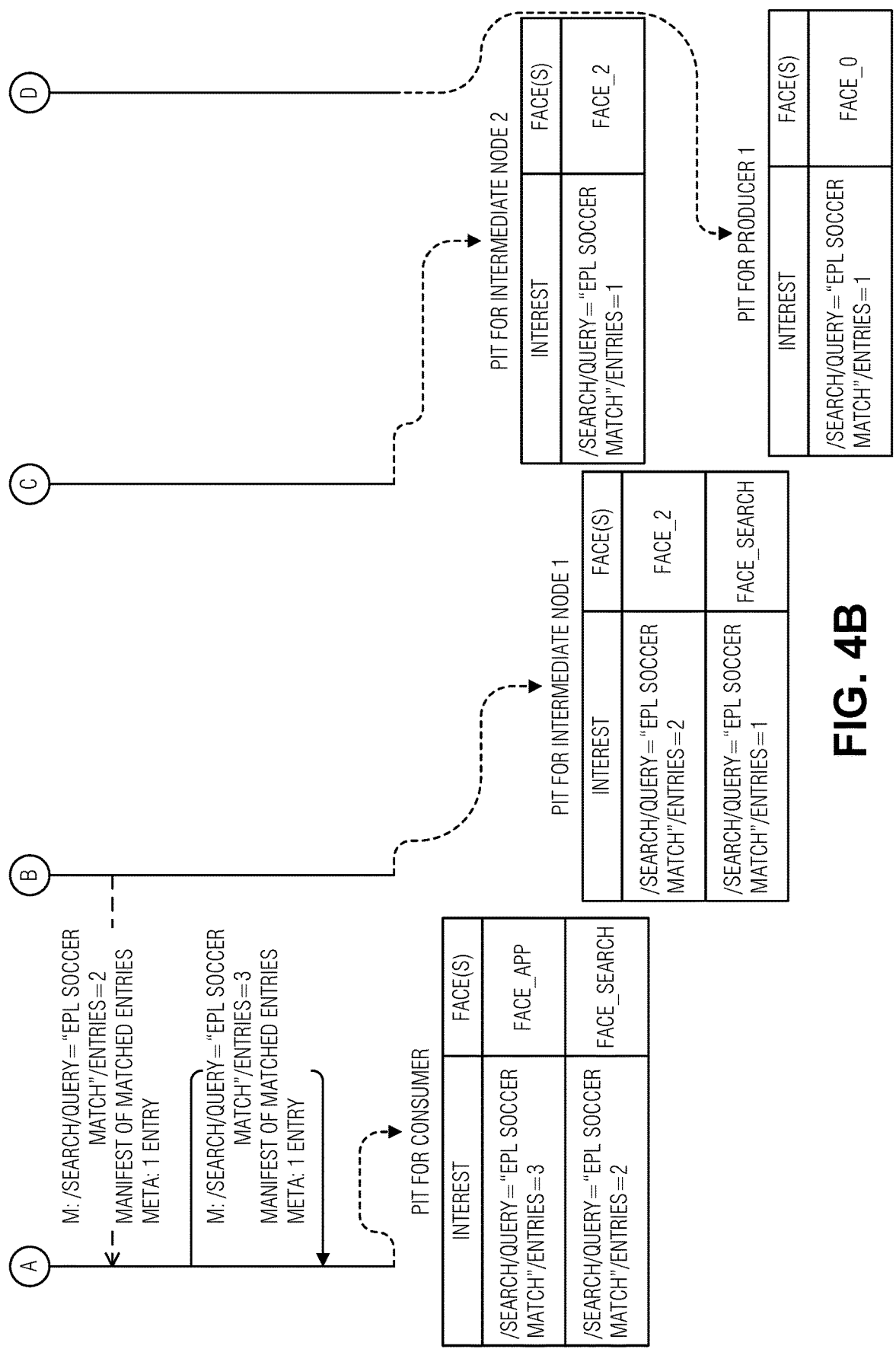

FIGS. 4A-4B illustrate an example of a message flow during execution of a distributed search, according to an embodiment. This message flow is an illustration of that described above with respect to FIG. 1. In this example, the search interest includes the index_only parameter. Accordingly, the matched entries are returned as a manifest that contains links or actual names of the content that meets the search criteria. Here, meeting the search criteria is achieved when the elements of the search criteria are satisfied. Thus, if the search criteria call for an exact match, then meeting the search criteria involves an exact match. Similarly, if the search criteria define a close match (e.g., within a threshold number of terms, synonyms, etc.), then the criteria are met when such a match is found. Meeting the search criteria produces results that is like returning a set of hyperlinks in a web search engine. Once a requesting device has one or more manifests containing the content names for content that satisfies the search, separate interest packets may be sent using the content's given name in the more traditional ICN manner.

Figure 5:
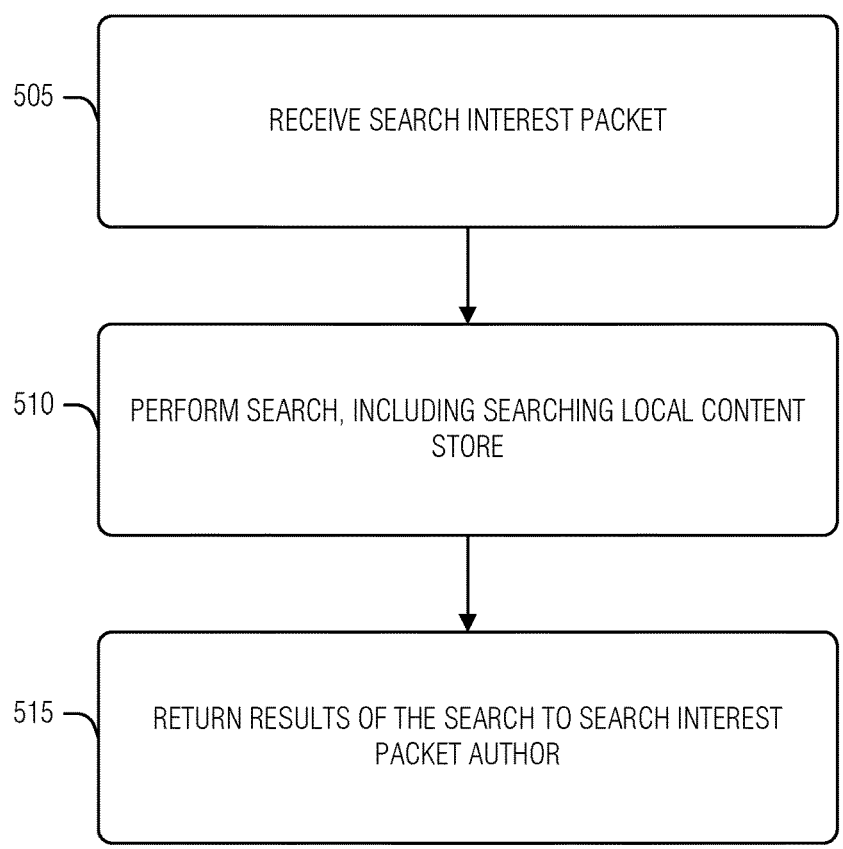
FIG. 5 is an example of a method for ICN distributed search with approximate cache and forwarding information lookup, according to an embodiment.

FIG. 5 is an example of a method for ICN distributed search with approximate cache and forwarding information lookup, according to an embodiment. The operations of the method 500 are implemented in computing hardware, such as that described in FIG. 6 or 7 (e.g., processing circuitry).

At operation 505, a search interest packet is received (e.g., at an ICN node). Here, the search interest packet includes search criteria and a signal indicating that it is a search interest packet. In an example, the signal is a prefix to the name, such as "/search" or "?" among others. Such a prefix enables the node to quickly ascertain that the interest packet is a search interest packet.

The search criteria may include a query and one or more parameters. The parameters may specify, for example, a minimum number of results to return, whether the results should be content or a manifest that lists the content, how similar content should be to be considered a match for the query, etc.

At operation 510, a search for content that meets the search criteria is performed. Here, the search includes searching the content store of the node (e.g., a local content store). In an example, when the search criteria include a similarity threshold, content meets the search criteria when a similarity score between the content and the query in the search interest meets the similarity threshold. This enables the search interest author to expand or contract the search results.

In an example, the local content store search uses an inverted index of the content store to match the search criteria to elements within the content store. In an example, the inverted index includes key words, phrases, or data segments as keys and a list of content or portions within content that correspond to a key.

In an example, when the search criteria include a minimum number of results and when fewer than the minimum number of results are found in the content store, the search includes creating a subsequent search interest and forwarding the subsequent search interest. Here, the subsequent search interest may include a modification to parameters of the search interest to acquire additional search results to meet the minimum number of results. In an example, forwarding the subsequent search interest includes adding an entry in the pending interest table (PIT) to match the subsequent search interest to the search interest. This entry may be later used to aggregate the local search results with the additional search results.

In an example, an inverted index of a FIB for the node is used to identify likely forwarding routes to complete the search. In an example, the subsequent interest includes a maximum search result that is a fraction of remaining search results to meet the minimum number of results based on the FIB. This helps to minimize wasted network resources by assuming that each of the recipients will likely return some portion of the needed additional content items and avoiding having to discard results in excess of the minimum number of search results specified in the search interest packet.

At operation 515, a data packet that includes results of the search is transmitted toward the author of the search interest packet. In an example, multiple data packets may be used to transmit the complete search results. In an example, the node aggregates search results from itself and other nodes before sending them back to the search interest author. In an example, the node sends search results back to the author as they arrive.

Figure 6:
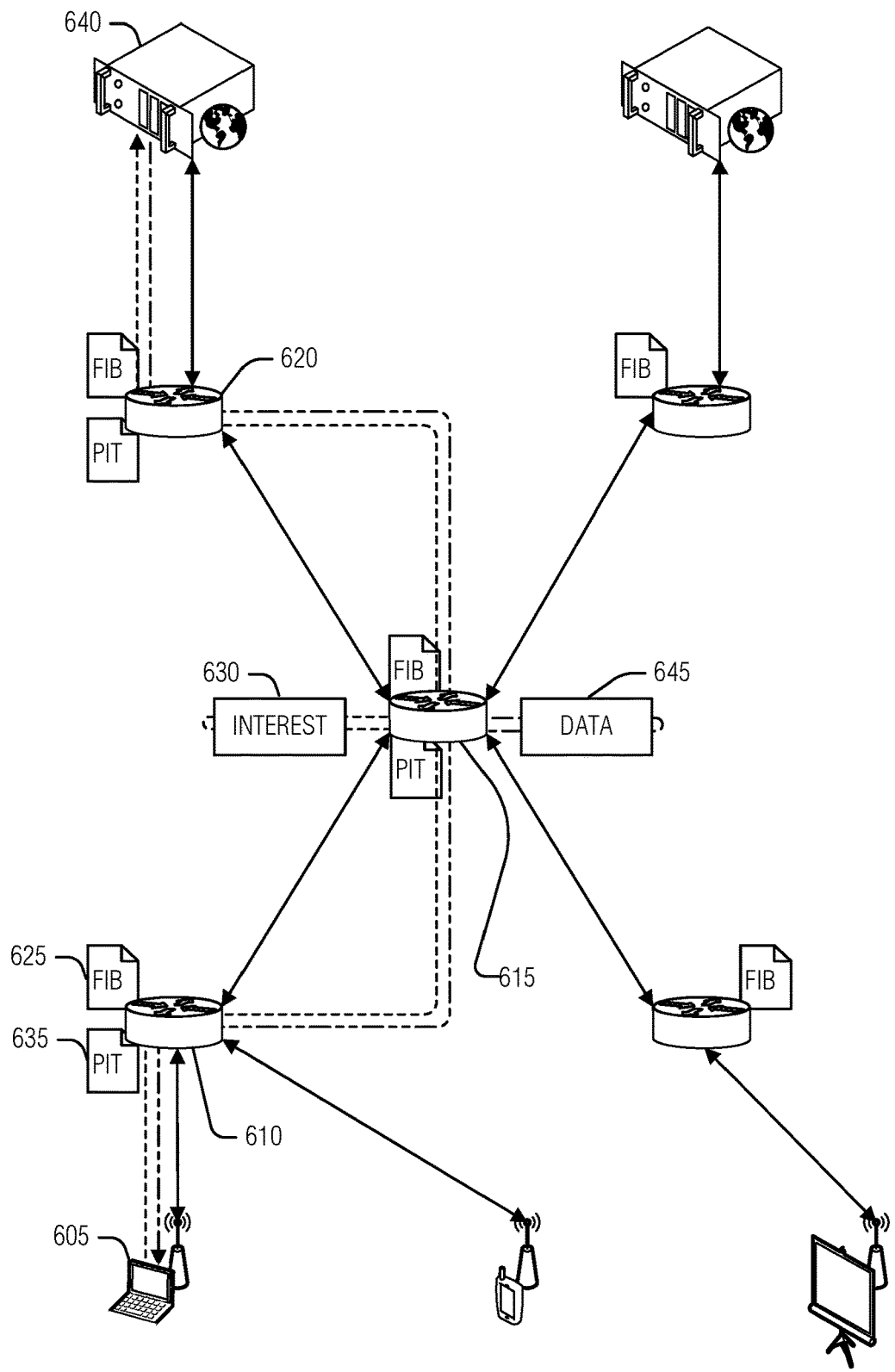
FIG. 6 illustrates an example ICN, according to an embodiment.
Figure 7:
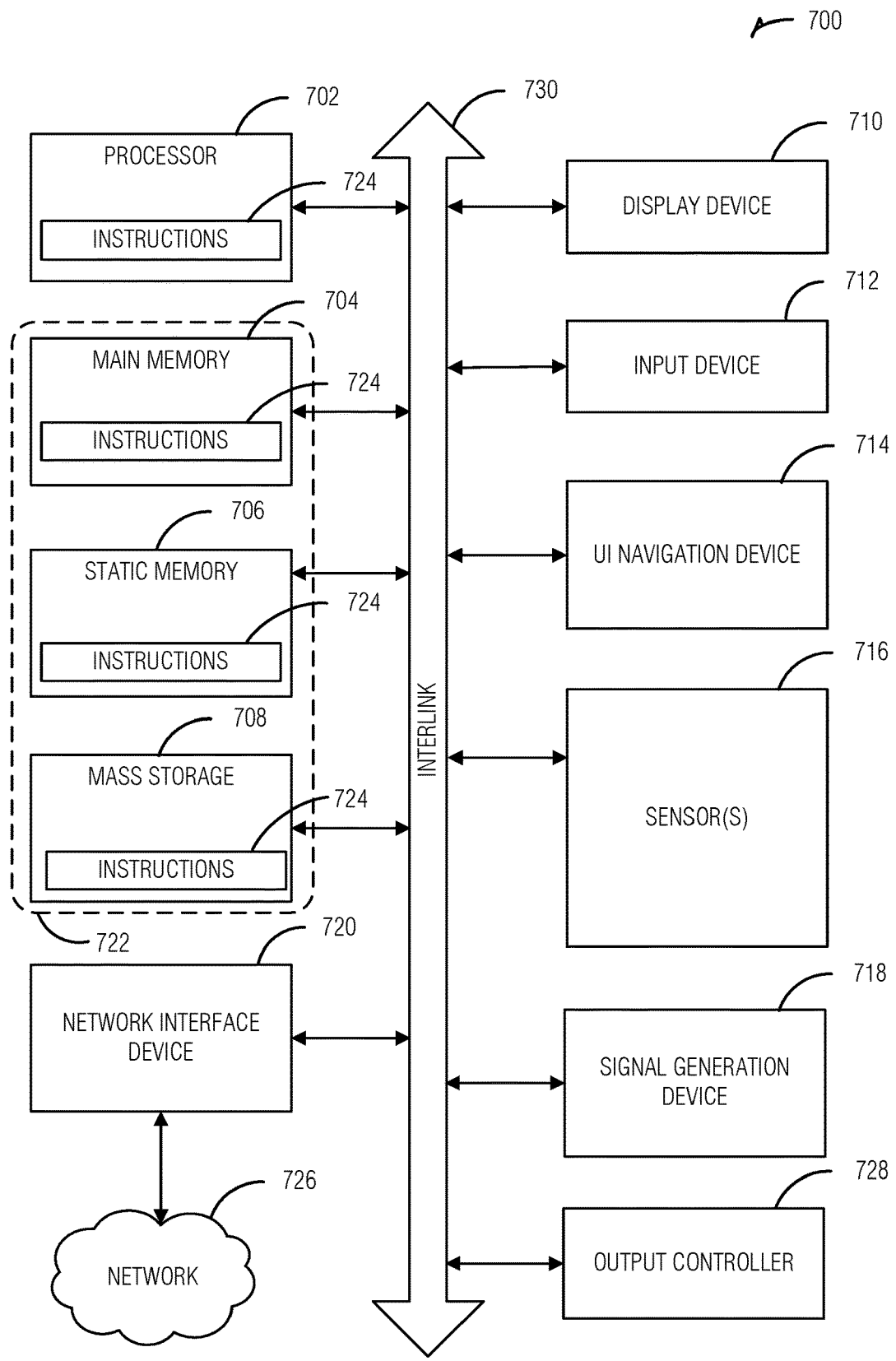
FIG. 7 is a block diagram illustrating an example of a machine upon which one or more embodiments may be implemented.

FIGS. 6 and 7 below provide additional details of the components in FIG. 1. For example, FIG. 6 illustrates several details and variations in ICNs. FIG. 7 illustrates several examples of computer hardware that may be used to implement any of the components illustrated in FIG. 1.

FIG. 6 illustrates an example ICN, according to an embodiment. ICNs operate differently than traditional host-based (e.g., address-based) communication networks. ICN is an umbrella term for a networking paradigm in which information itself is named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 605 (e.g., subscriber) requests named content from the network itself. The content request may be called an interest and transmitted via an interest packet 630. As the interest packet traverses network devices (e.g., network elements, routers, switches, hubs, etc.)—such as network elements 610, 615, and 620—a record of the interest is kept, for example, in a pending interest table (PIT) at each network element. Thus, network element 610 maintains an entry in its PIT 635 for the interest packet 630, network element 615 maintains the entry in its PIT, and network element 620 maintains the entry in its PIT.

When a device, such as publisher 640, that has content matching the name in the interest packet 630 is encountered, that device 640 may send a data packet 645 in response to the interest packet 630. Typically, the data packet 645 is tracked back through the network to the source (e.g., device 605) by following the traces of the interest packet 630 left in the network element PITs. Thus, the PIT 635 at each network element establishes a trail back to the subscriber 605 for the data packet 645 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 630 traverses the ICN, ICN network elements will generally attempt to match the name to a greatest degree. Thus, if an ICN element has a cached item or route for both "www-.somedomain.com or videos" and "www.somedomain.com or videos or v8675309," the ICN element will match the later for an interest packet 630 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 630 to data cached in the ICN element. Thus, for example, if the data 645 named in the interest 630 is cached in network element 615, then the network element 615 will return the data 645 to the subscriber 605 via the network element 610. However, if the data 645 is not cached at network element 615, the network element 615 routes the interest 630 on (e.g., to network element 620). To facilitate routing, the network elements may use a forwarding information base 625 (FIB) to match named data to an interface (e.g., physical port) for the route. Thus, the FIB 625 operates much like a routing table on a traditional network device.

In an example, additional meta-data may be attached to the interest packet 630, the cached data, or the route (e.g., in the FIB 625), to provide an additional level of matching. For example, the data name may be specified as "www.somedomain.com or videos or v8675309," but also include a version number—or timestamp, time range, endorsement, etc. In this example, the interest packet 630 may specify the desired name, the version number, or the version range. The matching may then locate routes or cached data matching the name and perform the additional comparison of meta-data or the like to arrive at an ultimate decision as to whether data or a route matches the interest packet 630 for respectively responding to the interest packet 630 with the data packet 645 or forwarding the interest packet 630.

ICN has advantages over host-based networking because the data segments are individually named. This enables aggressive caching throughout the network as a network element may provide a data packet 630 in response to an interest 630 as easily as an original author 640. Accordingly, it is less likely that the same segment of the network will transmit duplicates of the same data requested by different devices.

Fine grained encryption is another feature of many ICN networks. A typical data packet 645 includes a name for the data that matches the name in the interest packet 630.

Further, the data packet 645 includes the requested data and may include additional information to filter similarly named data (e.g., by creation time, expiration time, version, etc.). To address malicious entities providing false information under the same name, the data packet 645 may also encrypt its contents with a publisher key or provide a cryptographic hash of the data and the name. Thus, knowing the key (e.g., from a certificate of an expected publisher 640) enables the recipient to ascertain whether the data is from that publisher 640. This technique also facilitates the aggressive caching of the data packets 645 throughout the network because each data packet 645 is self-contained and secure. In contrast, many host-based networks rely on encrypting a connection between two hosts to secure communications. This may increase latencies while connections are being established and prevents data caching by hiding the data from the network elements.

Example ICN networks include: content centric networking (CCN)—as specified in the Internet Engineering Task Force (IETF) draft specifications for CCNx 0.x and CCN 1.x; named data networking (NDN)—as specified in the NDN technical report DND-0001; Data-Oriented Network Architecture (DONA)—as presented at proceedings of the 2007 Association for Computing Machinery's (ACM) Special Interest Group on Data Communications (SIGCOMM) conference on Applications, technologies, architectures, and protocols for computer communications; Named Functions Networking (NFN); 4WARD; Content Aware Searching, Retrieval and Streaming (COAST); Convergence of Fixed and Mobile Broadband Access/Aggregation Networks (COMBO); Content Mediator Architecture for Content-Aware Networks (COMET); CONVERGENCE; GreenICN; Network of Information (NetInf); IP Over ICN (POINT); Publish-Subscribe Internet Routing Paradigm (PSIRP); Publish Subscribe Internet Technology (PURSUIT); Scalable and Adaptive Internet Solutions (SAIL); Universal, Mobile-Centric and Opportunistic Communications Architecture (UMOBILE); among others.

FIG. 7 illustrates a block diagram of an example machine 700 upon which any one or more of the techniques (e.g., methodologies) discussed herein may perform. Examples, as described herein, may include, or may operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 may include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drive, tape drive, flash storage, or other block devices) some or all of which may communicate with each other via an interlink (e.g., bus) 730. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 may be, or include, a machine readable medium 722 on which is stored one or more sets of data structures or instructions 724 (e.g., software) embodying or utilized by any one or more of the techniques or functions described herein. The instructions 724 may also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 may constitute the machine readable media 722. While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

ADDITIONAL NOTES & EXAMPLES

Example 1 is a device for an information centric network (ICN) distributed search with approximate cache and forwarding information lookup, the device comprising: processing circuitry; and memory including instructions that, when the device is operating, configure the processing circuitry to: receive a search interest packet, the search interest packet including search criteria and a signal indicating that it is a search interest packet; perform a search for content that meets the search criteria, the search including searching a local content store; and transmit a data packet towards an author of the search interest packet, the data packet including results of the search.

In Example 2, the subject matter of Example 1, wherein, to search the local content store, the processing circuitry uses an inverted index of the content store to match the search criteria to elements within the content store.

In Example 3, the subject matter of Example 2, wherein the inverted index includes key words, phrases, or data segments as keys and a list of content or portions within content that correspond to a key.

In Example 4, the subject matter of any of Examples 1-3, wherein the search criteria include a minimum number of results, wherein fewer than the minimum number of results are found in the content store, and wherein, to perform the search for the content, the instructions configure the processing circuitry to: create a subsequent search interest, the subsequent search interest including modification to parameters of the search interest to acquire additional search results to meet the minimum number of results; and forward the subsequent search interest.

In Example 5, the subject matter of Example 4, wherein, to forward the subsequent search interest, the processing circuitry adds an entry in the pending interest table (PIT) to match the subsequent search interest to the search interest.

In Example 6, the subject matter of any of Examples 4-5, wherein an inverted index of a forwarding interest base (FIB) is used to identify likely forward routes to complete the search.

In Example 7, the subject matter of Example 6, wherein the subsequent interest includes a maximum search result that is a fraction of remaining search results to meet the minimum number of results based on the FIB.

In Example 8, the subject matter of any of Examples 4-7, wherein a cluster head creates the subsequent search interest packet.

In Example 9, the subject matter of Example 8, wherein the cluster head aggregates responses to the subsequent search interest packet.

In Example 10, the subject matter of any of Examples 1-9, wherein the search criteria include a similarity threshold, content meeting the search criteria when a similarity score between the content and a query in the search interest meets the similarity threshold.

In Example 11, the subject matter of any of Examples 1-10, wherein the search interest packet includes a stop-list field that indicates content that matches the search criteria but should not be returned.

Example 12 is a method for an information centric network (ICN) distributed search with approximate cache and forwarding information lookup, the method comprising: receiving a search interest packet, the search interest packet including search criteria and a signal indicating that it is a search interest packet; performing a search for content that meets the search criteria, the search including searching a local content store; and transmitting a data packet towards an author of the search interest packet, the data packet including results of the search.

In Example 13, the subject matter of Example 12, wherein searching the local content store includes using an inverted index of the content store to match the search criteria to elements within the content store.

In Example 14, the subject matter of Example 13, wherein the inverted index includes key words, phrases, or data segments as keys and a list of content or portions within content that corresponds to a key.

In Example 15, the subject matter of any of Examples 12-14, wherein the search criteria include a minimum number of results, wherein fewer than the minimum number of results are found in the content store, and wherein performing the search for the content includes: creating a subsequent search interest, the subsequent search interest including modification to parameters of the search interest to acquire additional search results to meet the minimum number of results; and forwarding the subsequent search interest.

In Example 16, the subject matter of Example 15, wherein forwarding the subsequent search interest includes adding an entry in the pending interest table (PIT) to match the subsequent search interest to the search interest.

In Example 17, the subject matter of any of Examples 15-16, wherein an inverted index of a forwarding interest base (FIB) is used to identify likely forward routes to complete the search.

In Example 18, the subject matter of Example 17, wherein the subsequent interest includes a maximum search result that is a fraction of remaining search results to meet the minimum number of results based on the FIB.

In Example 19, the subject matter of any of Examples 15-18, wherein a cluster head creates the subsequent search interest packet.

In Example 20, the subject matter of Example 19, wherein the cluster head aggregates responses to the subsequent search interest packet.

In Example 21, the subject matter of any of Examples 12-20, wherein the search criteria include a similarity threshold, content meeting the search criteria when a similarity score between the content and a query in the search interest meets the similarity threshold.

In Example 22, the subject matter of any of Examples 12-21, wherein the search interest packet includes a stop-list field that indicates content that matches the search criteria but should not be returned.

Example 23 is a at least one machine-readable medium including instructions for an information centric network (ICN) distributed search with approximate cache and forwarding information lookup, the instructions, when executed by processing circuitry, cause the processing circuitry to perform operations comprising: receiving a search interest packet, the search interest packet including search criteria and a signal indicating that it is a search interest packet; performing a search for content that meets the search criteria, the search including searching a local content store; and transmitting a data packet towards an author of the search interest packet, the data packet including results of the search.

In Example 24, the subject matter of Example 23, wherein searching the local content store includes using an inverted index of the content store to match the search criteria to elements within the content store.

In Example 25, the subject matter of Example 24, wherein the inverted index includes key words, phrases, or data segments as keys and a list of content or portions within content that corresponds to a key.

In Example 26, the subject matter of any of Examples 23-25, wherein the search criteria include a minimum number of results, wherein fewer than the minimum number of results are found in the content store, and wherein performing the search for the content includes: creating a subsequent search interest, the subsequent search interest including modification to parameters of the search interest to acquire additional search results to meet the minimum number of results; and forwarding the subsequent search interest.

In Example 27, the subject matter of Example 26, wherein forwarding the subsequent search interest includes adding an entry in the pending interest table (PIT) to match the subsequent search interest to the search interest.

In Example 28, the subject matter of any of Examples 26-27, wherein an inverted index of a forwarding interest base (FIB) is used to identify likely forward routes to complete the search.

In Example 29, the subject matter of Example 28, wherein the subsequent interest includes a maximum search result that is a fraction of remaining search results to meet the minimum number of results based on the FIB.

In Example 30, the subject matter of any of Examples 26-29, wherein a cluster head creates the subsequent search interest packet.

In Example 31, the subject matter of Example 30, wherein the cluster head aggregates responses to the subsequent search interest packet.

In Example 32, the subject matter of any of Examples 23-31, wherein the search criteria include a similarity threshold, content meeting the search criteria when a similarity score between the content and a query in the search interest meets the similarity threshold.

In Example 33, the subject matter of any of Examples 23-32, wherein the search interest packet includes a stop-list field that indicates content that matches the search criteria but should not be returned.

Example 34 is a system for an information centric network (ICN) distributed search with approximate cache and forwarding information lookup, the system comprising: means for receiving a search interest packet, the search interest packet including search criteria and a signal indicating that it is a search interest packet; means for performing a search for content that meets the search criteria, the search including searching a local content store; and means for transmitting a data packet towards an author of the search interest packet, the data packet including results of the search.

In Example 35, the subject matter of Example 34, wherein the means for searching the local content store include means for using an inverted index of the content store to match the search criteria to elements within the content store.

In Example 36, the subject matter of Example 35, wherein the inverted index includes key words, phrases, or data segments as keys and a list of content or portions within content that corresponds to a key.

In Example 37, the subject matter of any of Examples 34-36, wherein the search criteria include a minimum number of results, wherein fewer than the minimum number of results are found in the content store, and wherein the means for performing the search for the content include: means for creating a subsequent search interest, the subsequent search interest including modification to parameters of the search interest to acquire additional search results to meet the minimum number of results; and means for forwarding the subsequent search interest.

In Example 38, the subject matter of Example 37, wherein the means for forwarding the subsequent search interest include means for adding an entry in the pending interest table (PIT) to match the subsequent search interest to the search interest.

In Example 39, the subject matter of any of Examples 37-38, wherein an inverted index of a forwarding interest base (FIB) is used to identify likely forward routes to complete the search.

In Example 40, the subject matter of Example 39, wherein the subsequent interest includes a maximum search result that is a fraction of remaining search results to meet the minimum number of results based on the FIB.

In Example 41, the subject matter of any of Examples 37-40, wherein a cluster head creates the subsequent search interest packet.

In Example 42, the subject matter of Example 41, wherein the cluster head aggregates responses to the subsequent search interest packet.

In Example 43, the subject matter of any of Examples 34-42, wherein the search criteria include a similarity threshold, content meeting the search criteria when a similarity score between the content and a query in the search interest meets the similarity threshold.

In Example 44, the subject matter of any of Examples 34-43, wherein the search interest packet includes a stop-list field that indicates content that matches the search criteria but should not be returned.

Example 45 is at least one machine-readable medium including instructions that, when executed by processing circuitry, cause the processing circuitry to perform operations to implement of any of Examples 1-44.

Example 46 is an apparatus comprising means to implement of any of Examples 1-44.

Example 47 is a system to implement of any of Examples 1-44.

Example 48 is a method to implement of any of Examples 1-44.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for an information centric network (ICN) distributed search with approximate cache and forwarding information lookup, the device comprising:
    processing circuitry; and
    memory including instructions that, when the device is operating, configure the processing circuitry to:
        receive a search interest packet, a name of the search interest packet including search criteria and a signal indicating that it is a search interest packet, wherein the search criteria include a query and one or more parameters, and wherein the signal indicating that is a search interest packet is a prefix in the name;
        extract, from the name of the search interest packet, the query and the one or more parameters in response to the signal;
        perform a search for content that meets the search criteria by performing the query with the one or more parameters, the search including searching a local content store; and
        transmit a data packet towards an author of the search interest packet, the data packet including results of the search, wherein the device is an ICN node.

2. The device of claim 1, wherein, to search the local content store, the processing circuitry uses an inverted index of the content store to match the search criteria to elements within the content store.

3. The device of claim 1, wherein the search criteria include a minimum number of results, wherein fewer than the minimum number of results are found in the content store, and wherein, to perform the search for the content, the instructions configure the processing circuitry to:
    create a subsequent search interest, the subsequent search interest including modification to parameters of the search interest to acquire additional search results to meet the minimum number of results; and
    forward the subsequent search interest.

4. The device of claim 3, wherein, to forward the subsequent search interest, the processing circuitry adds an entry in the pending interest table (PIT) to match the subsequent search interest to the search interest.

5. The device of claim 3, wherein an inverted index of a forwarding interest base (FIB) is used to identify likely forward routes to complete the search.

6. The device of claim 5, wherein the subsequent interest includes a maximum search result that is a fraction of remaining search results to meet the minimum number of results based on the FIB.

7. The device of claim 1, wherein the search criteria include a similarity threshold, content meeting the search criteria when a similarity score between the content and the query in the search interest meets the similarity threshold.

8. The device of claim 1, wherein the search interest packet includes a stop-list field that indicates content that matches the search criteria but should not be returned.

9. A method for an information centric network (ICN) distributed search with approximate cache and forwarding information lookup, the method performed by an ICN node, the method comprising:
- receiving a search interest packet, a name of the search interest packet including search criteria and a signal indicating that it is a search interest packet, wherein the search criteria include a query and one or more parameters, and wherein the signal indicating that is a search interest packet is a prefix in the name;
- extracting, from the name of the search interest packet, the query and the one or more parameters in response to the signal;
- performing a search for content that meets the search criteria, the search including searching a local content store; and
- transmitting a data packet towards an author of the search interest packet, the data packet including results of the search.

10. The method of claim 9, wherein searching the local content store includes using an inverted index of the content store to match the search criteria to elements within the content store.

11. The method of claim 9, wherein the search criteria include a minimum number of results, wherein fewer than the minimum number of results are found in the content store, and wherein performing the search for the content includes:
- creating a subsequent search interest, the subsequent search interest including modification to parameters of the search interest to acquire additional search results to meet the minimum number of results; and
- forwarding the subsequent search interest.

12. The method of claim 11, wherein forwarding the subsequent search interest includes adding an entry in the pending interest table (PIT) to match the subsequent search interest to the search interest.

13. The method of claim 11, wherein an inverted index of a forwarding interest base (FIB) is used to identify likely forward routes to complete the search.

14. The method of claim 13, wherein the subsequent interest includes a maximum search result that is a fraction of remaining search results to meet the minimum number of results based on the FIB.

15. The method of claim 9, wherein the search criteria include a similarity threshold, content meeting the search criteria when a similarity score between the content and the query in the search interest meets the similarity threshold.

16. The method of claim 9, wherein the search interest packet includes a stop-list field that indicates content that matches the search criteria but should not be returned.

17. At least one non-transitory machine-readable medium including instructions for an information centric network (ICN) distributed search with approximate cache and forwarding information lookup, the instructions, when executed by processing circuitry of an ICN node, cause the processing circuitry to perform operations comprising:
- receiving a search interest packet, a name of the search interest packet including search criteria and a signal indicating that it is a search interest packet, wherein the search criteria include a query and one or more parameters, and wherein the signal indicating that is a search interest packet is a prefix in the name;
- extracting, from the name of the search interest packet, the query and the one or more parameters in response to the signal;
- performing a search for content that meets the search criteria, the search including searching a local content store; and
- transmitting a data packet towards an author of the search interest packet, the data packet including results of the search.

18. The at least one non-transitory machine-readable medium of claim 17, wherein searching the local content store includes using an inverted index of the content store to match the search criteria to elements within the content store.

19. The at least one non-transitory machine-readable medium of claim 17, wherein the search criteria include a minimum number of results, wherein fewer than the minimum number of results are found in the content store, and wherein performing the search for the content includes:
- creating a subsequent search interest, the subsequent search interest including modification to parameters of the search interest to acquire additional search results to meet the minimum number of results; and
- forwarding the subsequent search interest.

20. The at least one non-transitory machine-readable medium of claim 19, wherein forwarding the subsequent search interest includes adding an entry in the pending interest table (PIT) to match the subsequent search interest to the search interest.

21. The at least one non-transitory machine-readable medium of claim 19, wherein an inverted index of a forwarding interest base (FIB) is used to identify likely forward routes to complete the search.

22. The at least one non-transitory machine-readable medium of claim 21, wherein the subsequent interest includes a maximum search result that is a fraction of remaining search results to meet the minimum number of results based on the FIB.

23. The at least one non-transitory machine-readable medium of claim 17, wherein the search criteria include a similarity threshold, content meeting the search criteria when a similarity score between the content and the query in the search interest meets the similarity threshold.

24. The at least one non-transitory machine-readable medium of claim 17, wherein the search interest packet includes a stop-list field that indicates content that matches the search criteria but should not be returned.

* * * * *